United States Patent [19]

Schlapp et al.

[11] Patent Number: 4,732,422
[45] Date of Patent: Mar. 22, 1988

[54] SLIDING-LIFTING ROOF FOR AUTOMOBILES

[75] Inventors: Albert Schlapp, Dreieich; Rudolf Roos, Maintal, both of Fed. Rep. of Germany

[73] Assignee: Rockwell-Golde G.m.b.H., Fed. Rep. of Germany

[21] Appl. No.: 888,617

[22] Filed: Jul. 23, 1986

[30] Foreign Application Priority Data

Jul. 27, 1985 [DE] Fed. Rep. of Germany ..... 35269545

[51] Int. Cl.⁴ .............................................. B60J 7/05
[52] U.S. Cl. .................................... 296/221; 296/222; 296/223
[58] Field of Search ..................... 296/216, 221–224

[56] References Cited

U.S. PATENT DOCUMENTS 4,403,805  9/1983  Strem, Jr. ............................. 296/221
4,417,763  11/1983 Schlapp .......................... 296/221 X

FOREIGN PATENT DOCUMENTS 66875   2/1940  Czechoslovakia ................... 296/221
42539   1/1938  Netherlands ........................ 296/221

Primary Examiner—Dennis H. Pedder

[57] ABSTRACT

In a sliding-lifting roof, in which a lid associated with a roof opening is pivotally mounted on an intermediate frame in the vicinity of its forward edge, apart from forward sliding elements, there is provided for the sliding guidance of the lid on lateral guide rails and driven rear sliding elements, guide carriages which are capable of being coupled to the rear sliding elements and are also guided on the guide rails, which are connected with the intermediate frame by link rods. The guide carriages and the link rods permit a lowering movement of the lid, by means of which, in spite of the use of an intermediate frame for the edge gap sealing, a small overall height is attained, because the lid is displaced in a parallel position and not in an inclined position beneath the fixed automobile roof. The pivotal movements of the lid are effected through two guide blocks which for this purpose engage with only one guide pin. a reliable holding of the lid is achieved in all pivoted positions of the lid.

7 Claims, 11 Drawing Figures

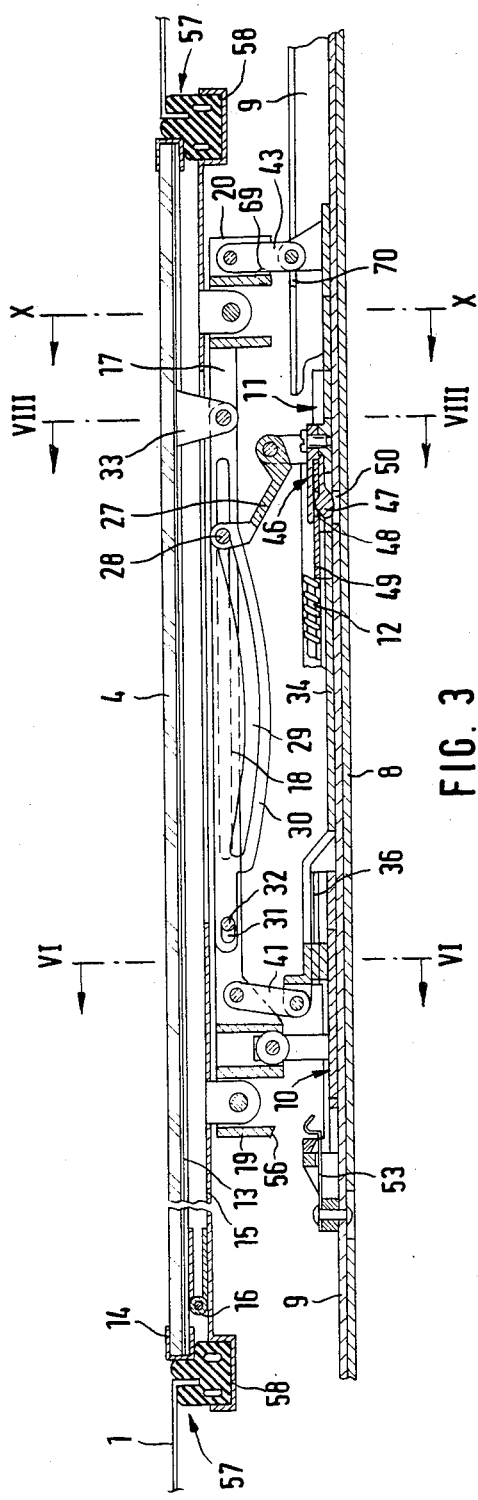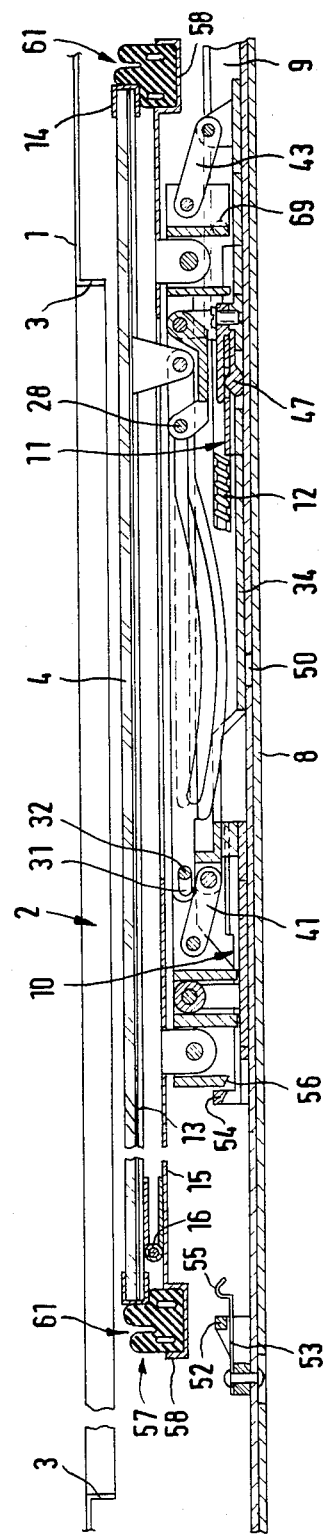

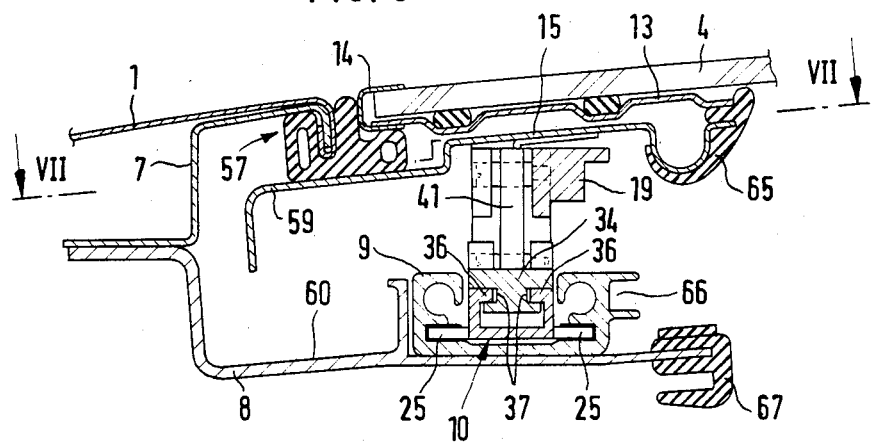
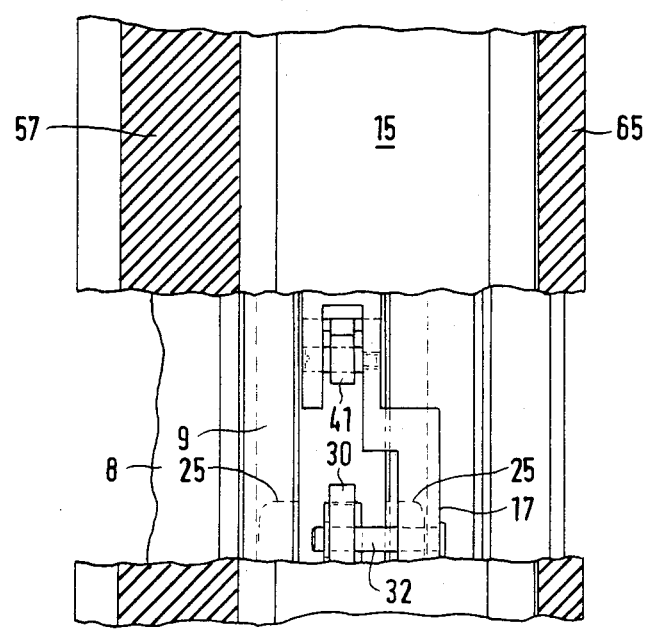

SLIDING-LIFTING ROOF FOR AUTOMOBILES

FIELD OF THE INVENTION

This invention relates to a sliding-lifting roof for automobiles.

DESCRIPTION OF THE PRIOR ART

A sliding-lifting roof is known DE-PS 30 20 675 which comprises a rigid lid which, in its closed position, closes a roof opening with formation of a peripheral edge gap, which lid is laterally guided on guide rails in the roof opening by forward and rearward sliding elements, is driven by cables slidably guided in compression-transmitting manner attached to the rear sliding elements, and can either be lifted as desired by raising its rear edge in the manner of forwardly hinged ventilating flaps or, after a lowering movement, can be slid beneath the rear, fixed roof surface, is pivotally mounted in the vicinity of its forward edge on an intermediate frame which engages, at least with its rearward frame portion, beneath the edge gap with incorporation of sealing elements which, in the closed position, bear on the one hand against the lower side of the lid and on the other hand against the lower side of the roof surface, and is drivingly connected with the lid and the rearward sliding elements, the intermediate frame being fixed in the closed position during pivotal movements of the lid and, starting from the closed position, being slidable together with the lid after the lowering movement, a first guide block furthermore being fixed to each side of the intermediate frame, into which guide block a raising lever pivotally journalled on the rear sliding element engages with a guide pin, which raising lever is connected, via a further guide pin engagement, with a second guide block which is connected with the lid for the purpose of driving same.

A characteristic component of one known sliding-lifting roof of this type is disclosed in DE-PS No. 30 20 675, where an intermediate frame is disposed between the rigid lid and the sliding roof frame fixed in a usual manner in the roof opening. This intermediate frame permits an especially effective sealing of the edge gap from below and makes possible a secure locking of the closed lid against undesired lifting of its rear edge. Since with its help the pivot bearing assembly can be provided in the immediate vicinity of the forward edge of the lid, the lid does not dip notably into the roof opening when pivoted outwards, nor does a fairly large gap occur between the forward edge of the lid and the adjacent edge of the roof opening.

This known sliding-lifting roof construction possesses, with its advantages, nevertheless the disadvantage regularly encountered in sliding roofs and slidinglifting roofs, in that the lowering movement of the lid before its displacement beneath the rear, fixed roof surface is carried out at its rear edge, with the result that the lid has to be slid in an inclined position beneath the fixed roof surface. This inclined position requires a corresponding overall depth of the construction, in order that the oblique lid can be accommodated beneath the rear roof surface. Large construction depths of the roof structure are, however, undesirable, because they restrict the headroom in the vehicle interior. Furthermore, in the construction shown in DE-PS No. 30 20 675, allowance must be made in the design of the two guide blocks for the fact that the guide blocks must ensure both the control of the pivoting out and pivoting in movement and also the control of the lowering movement and the movement opposed to it. For this purpose, on the one hand the guide pin engaging into the slit of the first guide block and on the other hand two further sliding pins engaging into the slit of the second guide block are provided on the raising lever. These comparatively closely located pins ensure, in conjunction with the guide tracks associated with them on the two guide blocks, of which the one is mounted fixed on the lid and the other fixed on the intermediate frame, for the supporting of the raised lid, on which appreciable forces act during travelling due to the air flow. Exacting requirements are therefore imposed on the freedom from play of the lid mounting.

In a further known sliding-lifting roof disclosed in DE-OS No. 30 38 353, the lid is already indeed so guided that in the lowering movement it remains parallel, before it is displaced beneath the rear, fixed roof surface, which makes possible a low overall constructional depth, but in this known roof construction no intermediate frame is provided. The parallel lowering and raising of the lid is achieved, on the one hand, by slide block guides disposed on the forward sliding elements and, on the other hand, by rods articulated to the rearward sliding elements and hinged on the lid. These rods, however, serve also for bringing about the pivotal movements of the lid, but, on account of their arrangement, permit only comparatively small outward pivotal movements and thus only small air gaps between the rear edge of the lid and the rear edge of the roof opening.

The object of the present invention is, in a slidinglifting roof of the initially described type with intermediate frame, to decrease the overall constructional depth while at the same time simplifying the drive engagement on the guide blocks, and to improve the securing of the lid when the latter is pivoted upwards.

SUMMARY OF THE INVENTION

According to the present invention, there is provided a sliding-lifting roof for an automobile, the roof comprising a rigid lid, which in its closed position closes a roof opening while forming a peripheral edge gap, guide rails and forward and rear sliding elements for laterally guiding the lid in the roof opening, cables for driving the lid, said cables being guided in compression-transmitting manner and being attached to the rear sliding elements, the lid being able to be raised by lifting its rear edge in the manner of forwardly hinged ventilating flaps or, after a lowering movement, can be displaced beneath the rear, fixed roof surface, an intermediate frame having a rear frame portion and sealing elements, the lid being pivotally mounted in the vicinity of its forward edge on said intermediate frame which engages, at least with its rear frame portion, beneath the edge gap with incorporation of the sealing elements which bear, in the closed position, on the one hand against the lower face of the lid and on the other hand against the lower face of the roof surface, and which is drivingly connected with the lid and with the rear sliding elements, the intermediate frame being fixed in the closed position during pivotal movements of the lid and, starting from the closed position, being slidable together with the lid after the lowering movement, a first guide block furthermore being attached to each side of the intermediate frame into which guide block a raising lever pivotally journalled on the rear sliding element engages with a guide pin, which raising lever is connected, via a further guide pin engagement, with a second guide block which is connected with the lid for the purpose of driving same; and an elongate guide carriage, capable of being coupled to the rear sliding element being slidably mounted on each guide rail, which guide carriage is connected at its forward and rear ends via link rods, orientated in the same direction, to the intermediate frame, the sliding carriage, the link rods and the intermediate frame constituting at least approximately a linkage parallelogram, and only the guide pin on the raising lever engages into both the guide blocks and the second guide block is connected at its forward end to the intermediate frame by a sliding hinge and is articulated at its rear end to the lid.

By the link rod connection of the intermediate frame to a guide carriage slidable on the guide rails, the lid can be lowered parallel to itself substantially without tilting and can be displaced in this position beneath the rear, fixed roof surface, with the result that the overall depth of the roof construction is considerably reduced. Since the parallel link rods ensure the lowering movement of the lid and, of course, the reverse movement, no measures need to be adopted for this purpose at the two guide blocks, which results in considerable simplification of the two guide blocks. A further substantial simplification is obtained by the engagement of one and the same guide pin into both the guide blocks for controlling the pivoting out and pivoting in movements of the lid. The second guide block is, in the present roof construction, no longer rigidly fixed to the lid, but is articulated like a hinged lever on the one hand to the lid and on the other hand to the intermediate frame. By this arrangement, a further support point for the lid on the intermediate frame is obtained, which is at a considerable distance from the support point formed by the guide pin, which improves the security of the lid when pivoted out.

Since the construction of the sliding-lifting roof in respect of its functional parts situated in the region of the two lateral guide rails is substantially a mirror image, only one side of the roof will be discussed in the context of this description and the claims.

Preferably, provision is made so that the guide carriage and the rear sliding element shall be coupled to each other in the closed position of the lid and in all slid positions and shall be uncoupled from each other in all pivoted positions, the coupling and uncoupling being effected automatically by a drive movement of the rear sliding element at the end and beginning respectively of the pivoting movement, while the guide carriage is securely held in its position corresponding to the closed position of the lid.

With advantage, the arrangement here can be such that a coupling member is fixed to the guide carriage, which coupling member, when the guide carriage and rear sliding element are coupled together, engages resiliently with a projection into a coupling depression of the rear sliding element, which projection penetrates into the sliding movement path of the rear sliding element and can only be engaged and disengaged into and out of the coupling depression by edges of the rear sliding element acting upon it, in the position of the guide carriage corresponding to the closed position. The reversed arrangement of the coupling elements, namely the fixing of the coupling member to the rear sliding element and provision of the coupling depression on the guide carriage, is also possible.

Preferably, in the closed position and all pivoted positions of the lid, the forward sliding element is locked to a fixed stop which limits its closure sliding travel, the locking becoming effective when the forward sliding element meets the stop at the end of the closure displacement of the lid and being disengaged at the end of the lowering movement of the lid.

With advantage, for this purpose, a locking spring can be fixed to the fixed stop, which spring is equipped with a nose for automatically locking with a locking member of the forward sliding element, which nose, in the position of the intermediate frame corresponding to the closed position of the lid, is disposed, for the purpose of unlocking it at the end of the lowering movement, in the vertical movement path of a component rigidly connected to the intermediate frame. In this simple manner, assurance is provided that locking and unlocking take place as automatic procedures with the actuation of the lid, as is also the case in regard to the coupling and uncoupling of the guide carriage to and from the rear sliding element.

An advantageously simple and functionally suitable connection between intermediate frame and the forward sliding element is achieved if the intermediate frame is connected to the forward sliding element by vertical guide elements. In this way it is ensured that the position in height of the intermediate frame with respect to the forward sliding element can indeed change, but not the relative position of these components in regard to the sliding direction of the lid.

In an advantageously simple embodiment, provision is made that the vertical guide elements are composed of a guide bolt fixed to the forward sliding element and of a complementary guide channel formed on the intermediate frame, into which channel the guide bolt engages in all possible lid positions.

To achieve the largest possible support base for the intermediate frame and thus for the lid, the arrangement is preferably such that the forward link rod of the guide carriage is located between the forward and rearward sliding elements in the vicinity of the forward sliding element, and that the rearward link rod is located between the rearward sliding element and the rearward frame part of the intermediate frame. Consequently, the linkage parallelogram mentioned earlier and formed by the articulation points of the two link rods, has an elongate form, the length of which is many times its height.

Considerable uplift forces act upon the closed lid during travel, which can make the starting of a parallel lowering movement quite difficult, and render necessary considerable, but undesired, drive forces for initiating the lowering movement of the lid. In a preferred embodiment, this result is prevented in that, at the start of the lowering movement, firstly the forward or rearward edge, preferably, however, the rearward edge, of the lid is lowered slightly, to make possible a pressure equalisation through the gap thus appearing, before the actual lowering movement of the lid takes place. Advantageously, this result is obtained by the feature that the distance between the upper link pins, by which the forward and rearward link rods are articulated to the intermediate frame, is smaller than the distance between the lower link pins, by which the link rods are articulated on the guide carriage, the link pins on one of the link rods being located in an approximately vertical plane in respect of their axis centres in the closed position and in pivoted positions of the lid. With this preferred form of embodiment, the aforementioned linkage parallelogram has this form only approximately in the strictly geometrical sense, because one link rod is somewhat inclined in respect of the line connecting the axis centres of its link pins. If, upon initiation of the lowering movement, the guide carriage is now moved backwards relative to the intermediate frame and thus to the lid, the link rod orientated vertically in respect of the connecting line between the axis centres of its link pins moves somewhat in advance and pulls the edge of the lid associated with its downwards somewhat, whereas the obliquely orientated link rod still maintains the elevation of its upper link pin, indeed even increases it slightly, before it also pulls down the edge of the lid adjacent to it.

As already mentioned, the rear edge of the lid is preferably first lowered upon initiation of the lowering movement, which may favourably be achieved by the link pins of the rear link rod being situated in an approximately vertical plane in respect of their axis centres. Upon raising of the lid from its lowered position into its closed position, that edge of the lid which was first lowered upon initiation of the lowering movement is the last to be raised to the final height in the closed position.

An especially simple construction is obtained if the connection between the forward end of the second guide block and the intermediate frame by a sliding hinge is provided by an elongate hole formed on the second guide block and a link pin fixed to the first guide block and engaging into this hole. The idea of this construction is that the second guide block does not need to be connected, at its forward end, directly to the intermediate frame by a sliding hinge, but that an indirect connection, namely to the first guide block fixed to the intermediate frame, is equally effective. The elongated hole makes possible a relative sliding between the two guide blocks for length compensation during the pivotal movement of the second guide block.

A compact assembly, capable of being largely prefabricated, of functional components is achieved if the first guide block is extended forwards and backwards and if the link rods are articulated to these extensions.

With advantage, also, the guide channel of the vertical guide elements may be located in the forward extension of the first guide block. The fixed connection of the first guide block to the intermediate frame may also be effected in the region of the aforementioned extensions.

The substantially parallel lowering and raising capabililty of the intermediate frame and thus of the lid achieved by the forward and rear link rods makes possible an especially effective edge gap seal. For this purpose, a sealing profile can be provided for sealing the edge gap and can be fixed to the intermediate frame along its edges and all around. Upon closure of the lid, this sealing profile is pressed firmly from below by means of the intermediate frame both against the edges of the roof opening and also against the edges of the lid. By the fitting of the sealing profile on the intermediate frame, no sealing profiles need to be fitted to the edges of the lid, with the result that in all possible lid adjustment movements friction between sealing profile and edges of roof opening cannot occur.

An especially favourable arrangement is achieved if the sealing profile is furnished with an upwardly open groove, into which, in the closed position of the lid, a downwardly cranked flange of the roof opening engages. With the lid closed, an elastic close fit of the sealing profile to the peripheral edge bent down from the roof sheeting and surrounding the roof opening is achieved, by which an excellent seal is obtained.

BRIEF DESCRIPTION OF THE DRAWINGS

For a better understanding of the invention and to show how the same may be carried into effect, reference will now be made by way of example, to the accompanying drawings, in which:-

FIG. 3 is a cut-away longitudinal section through the closed sliding-lifting roof taken along the line III—III in FIG. 2;

FIG. 4 is a longitudinal section similar to FIG. 3, but with the lid lowered and partly displaced;

FIG. 6 is a cut-away cross-section through the roof construction taken on the lne VI—VI in FIG. 3;

FIG. 7 is a cut-away and partly exposed section taken along the line VII—VII in FIG. 6;

DESCRIPTION OF THE PREFERRED EMBODIMENT

Figure 1:
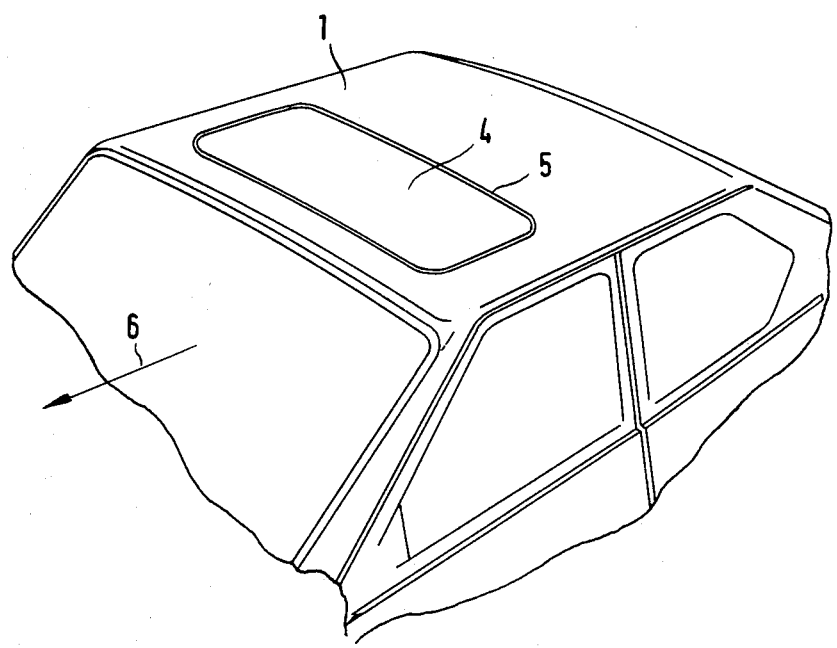
FIG. 1 is a cut-away perspective view of the roof of a private automobile with installed slidinglifting roof, the lid being closed.

In the drawings, FIGS. 6 to 11 are to a larger scale then FIGS. 2 to 5.

Figure 2:
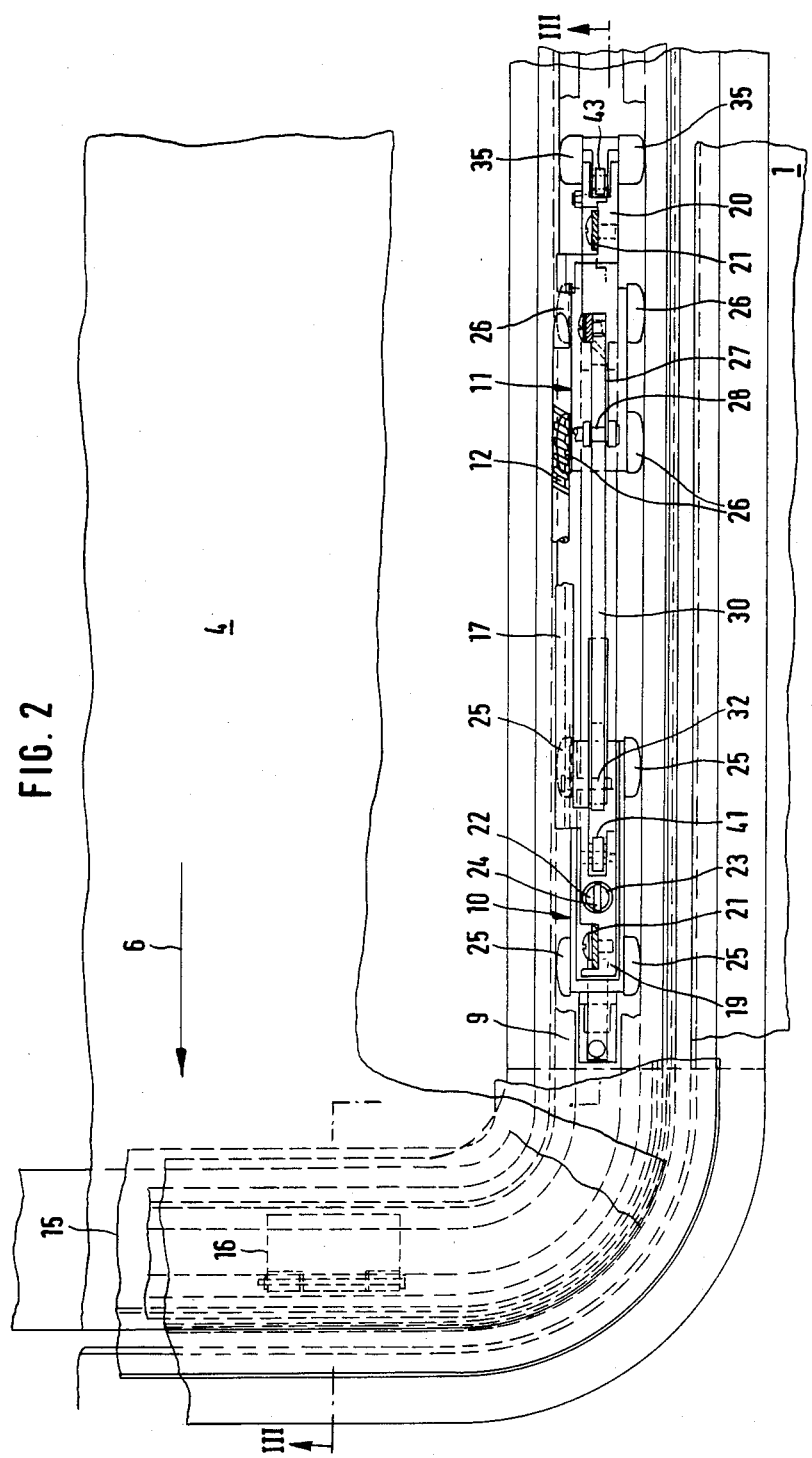
FIG. 2 is a cut-away and partly exposed plan on a sliding-lifting roof with the lid in its closed position.

For explaining the basic construction of the sliding-lifting roof, reference will first be made to the FIGS. 1 to 5. As can be seen therefrom, in a fixed automobile roof 1 there is a roof opening 2 (FIG. 4), bounded by a surrounding flange 3, downwardly cranked through 90° and forming the edges of the roof opening. The roof opening 2 is, in the closed position of the roof (FIGS. 1 to 3), closed by a correspondingly shaped, rigid lid 4 with formation of a peripheral edge gap 5. The forward direction of travel of the automobile, to which the terms "front" and "forward" and "rear" and "backwards" relate, is indicated in FIGS. 1 and 2 by the arrow 6.

Figure 8:
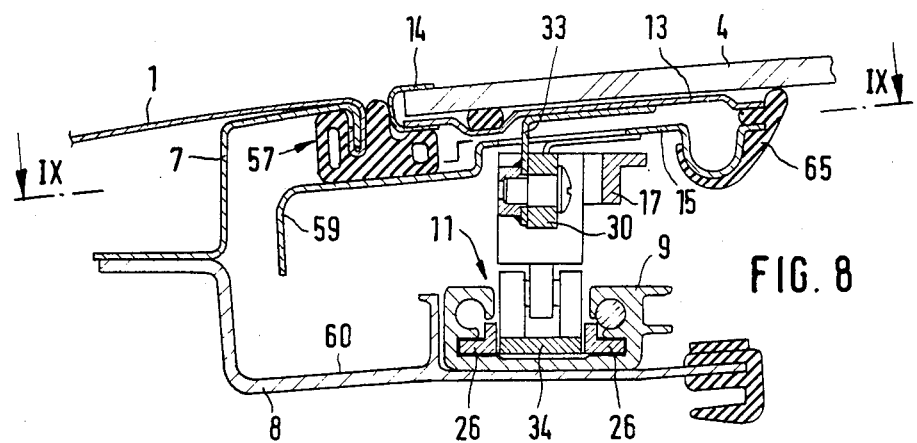
FIG. 8 is a cut-away cross-section through the roof construction taken on the line VIII—VIII in FIG. 3.
Figure 9:
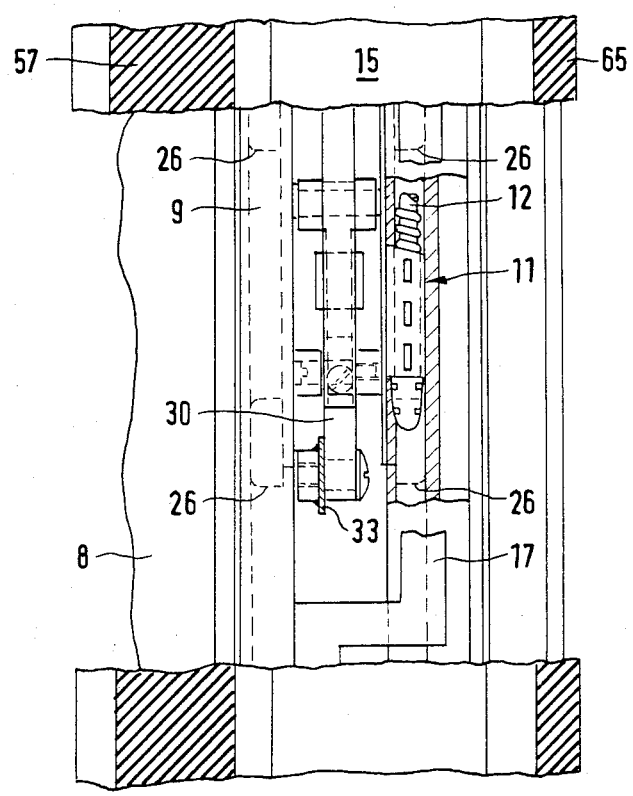
FIG. 9 is a cut-away and partly exposed section taken along the line IX—IX in FIG. 8.
Figure 10:
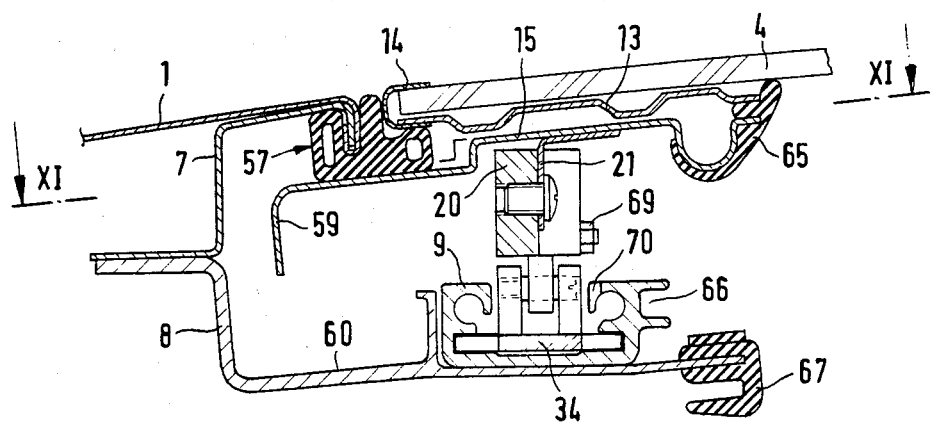
FIG. 10 is a cut-away cross-section through the roof construction taken on the line X—X in FIG. 3.
Figure 11:
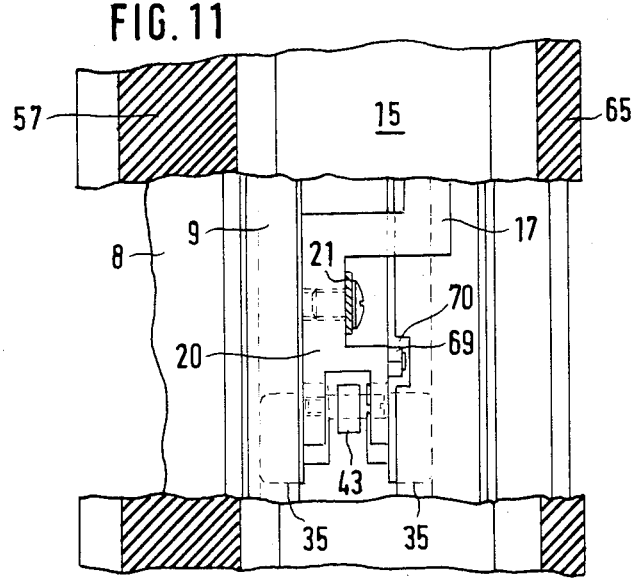
FIG. 11 is a cut-away and partly exposed section along the line XI—XI in FIG. 10.

At the front and sides, a frame 7 is attached to the flange 3, as can be seen in respect of its lateral fitting in FIGS. 6, 8 and 10. To this frame 7, the sliding roof frame 8, carrying the functional components of the sliding-lifting roof, is fixed, which frame 8 surrounds the roof opening at the front and sides and extends towards the rear beneath the rearward, fixed automobile roof 1 in the form of a receiving pocket, not shown, for the backwardly slid lid 4.

At each side of the roof opening 2, a guide rail 9 is fixed to the sliding roof frame 8, as can best be seen from the cross-sectional views of FIGS. 6, 8 and 10. In the drawings, only the right-hand guide rail 9 is shown. The arrangement on the left-hand side of the roof opening is, as already mentioned, to opposite hand, so that hereinafter all functional components will be mentioned only in the singular, although they are present twofold. The lid 4 is slidably mounted on the guide rail 9 with a foward sliding element 10 and rearward sliding element 11.

The connection of the sliding elements 10 and 11 to the lid 4 will be explained in more detail later. A drive cable 12, which is connected to a drive apparatus, not shown, and is slidably guided in pressure-transmitting manner in the guide rail 9, is attached to the rear sliding element 11.

All the movement functions of the sliding-lifting roof are carried out by means of the drive cable 12.

The lid 4 which, in the example shown, is constructed as a glass lid, rests sealingly upon a lid frame 13, firmly connected to it. The outer edges of the lid 4 and of the lid frame 13 are covered by a peripheral U-section member 14. Instead of the glass lid, a conventional sheet metal lid could, of course, be used.

Between the lid 4 and the sliding roof frame 8 is the single-piece intermediate frame 15, profiled from sheet metal. The lid 4 is connected to the intermediate frame 15 by hinges 16, the hinge eye of which is located near the forward edge of the lid 4. In this manner, the lid 4 is pivotally journalled relative to the intermediate frame 15, thus making possible raising of the lid 4 above the automobile roof 1. As can be seen, for instance, from FIGS. 3, 5 and 6, the intermediate frame 15 penetrates with its outer edge all round below the edge gap, as will be described later when explaining the sealing elements fitted to it.

Laterally and beneath the intermediate frame 15 is the first guide block 17, which is continued beyond the region of its straight guide slit 18 forwards and backwards by extensions 19 and 20 respectively, to an elongate component, on which several functional elements engage in a manner to be described later. The intermediate frame 15 is so fixed by means of lugs 21 attached to it to the extensions 19, 20 of the first guide block 17, that the guide block 17 and its slit 18 are orientated parallel to the intermediate frame 15.

On the forward sliding element 10, a vertically upwardly orientated guide bolt 22 is fixed, which makes the connection of the forward sliding element 10 to the intermediate frame 15 and, for this purpose, engages into a guide channel 23, which is situated in the forward extension 19 of the first guide block 17. To reduce friction between guide bolt 22 and guide channel 23 during lowering movements and reverse movements of the intermediate frame 15, a guide roller 24 is rotatably journalled on the guide bolt 22.

The forward sliding element 10 and rearward sliding element 11 are each slidably mounted by four guide shoes 25, 26 respectively in corresponding guide channels of the guide rail 9, as shown, for example, in FIGS. 2, 6 and 8.

On the rear sliding element 11, a raising lever 27 is pivotally journalled, at the outer end of which a guide pin 28 is fixed. The guide pin 28 engages both into the guide slit 18 of the first guide block 17 and into the guide slit 29 of a second guide block 30. The second guide block 30 possesses, at its forward end, an elongate hole 31, into which a hinge pin 32, fixed to the first guide block 17, engages. The elongate hole 31 and hinge pin 32 constitute a sliding hinge. At its rearward end, the second guide block 30 is articulated to a lug 33, mounted on the lid frame 13 in the vicinity of the rear edge of the lid 4. The guide slit 29 is composed of a curved forward region and a shorter, straight rear region. The curved region serves for the pivotal movement of the lid 4, while the straight region, which, in the closed position of the lid 4 (FIG. 3) coincides with the path of the guide slit 18 in the first guide block 17, permits sliding of the rear sliding element 11 relative to the intermediate frame 15 and the components fixed to it, during the lowering movement of the intermediate frame 15, to be executed in a manner to be described. By the coinciding position of the rear region of the slit 29 and of the slit 18 in the closed position (FIG. 3), a secure locking of the lid 4 against lifting of its rear edge is obtained, as a consequence of the guide pin 28 engaging into both these guide slits.

In addition to the two sliding elements 10, 11, an elongate guide carriage 34 is slidably mounted on the guide rail 9. For this purpose, the guide carriage 34 possesses, at the rear, two guide shoes 35, which engage correspondingly to the guide shoes 25, 26 of the two sliding elements 10, 11, into the guide rail 9. At its forward end, the guide carriage 34 is slidably mounted on the forward sliding element 10, as shown, for instance, in FIG. 5 in conjunction with FIG. 6. For this purpose, the forward sliding element 10 engages with guide bars 36 into guide grooves 37 of the guide carriage 34.

The guide carriage 34 possesses, at its forward and rear ends respectively, a bearing block 38, 39 respectively. At the forward bearing block 38, a forward link rod 41 is articulated by means of a link pin 40, whereas at the rear bearing blocks 39, a rear link rod 43 is articulated by a link pin 42. A link pin 44 provides an articulated connection between the forward link rod 41 and the forward extension 19 of the first guide block 17. Correspondingly, a link pin 45 provides an articulated connection of the rear link rod 43 to the rear extension 20 of the first guide block 17.

Figure 5:
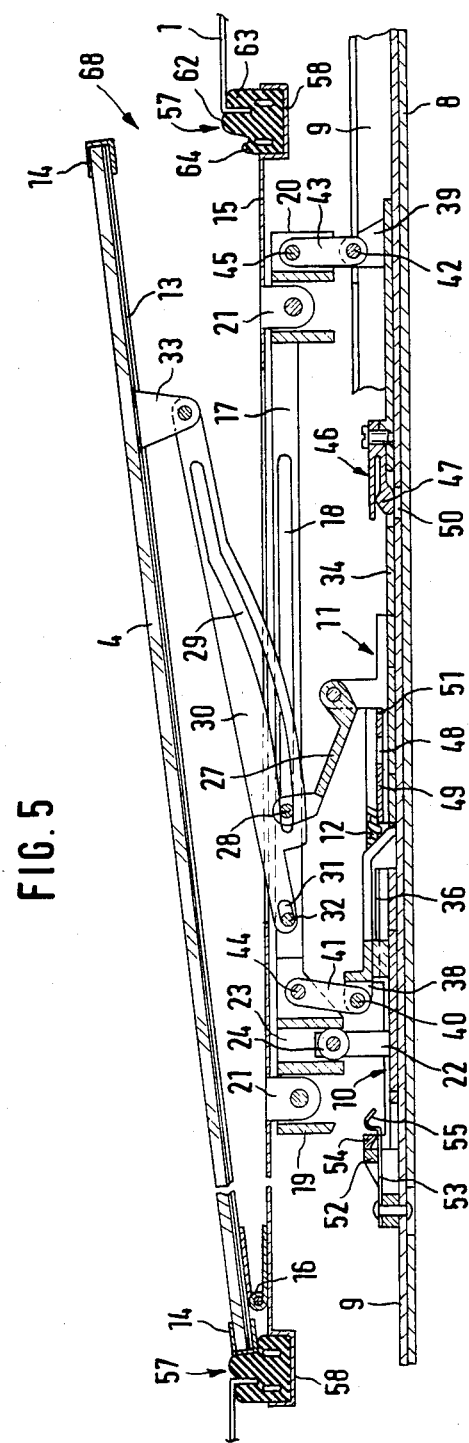
FIG. 5 is a longitudinal section similar to FIG. 3, but with the lid pivoted outwards and upwards.

As can be seen, for example from FIG. 5, the guide carriage 34, link rods 41 and 43 and intermediate frame 15 form approximately a linkage parallelogram, i.e. the link pins 40, 42, 44, 45 are situated at the corner points of a linkage or articulated parallelogram. In the raised position of the intermediate frame 15, shown in FIGS. 3 and 5, the link pins 42 and 45 of the rear link rod 43 lie in an approximately vertical plane in respect of their axis centres. The link pins 40 and 44 of the forward link rod 41, in contrast, lie in a plane inclined backwards relative to the vertical in respect of their axis centres. The distance between the upper link pins 44 and 45 is, therefore, smaller than that between the lower link pins 40 and 42. The resultant slightly differing orientations of the two link rods 41 and 43 is of importance for the movement characteristic upon initiation of the lowering movement, for the reasons yet to be described. The two link rods 41 and 43 are orientated in the same direction, to the extent that they extend upwards from lower link pins 40, 42 respectively.

The rear sliding element 11 can be coupled to the guide carriage 34. For this purpose, a coupling member 46 is fixed to the guide carriage 34, the coupling member possessing a resiliently mounted, upwardly orientated and forwardly and rearwardly chamfered projection 47, as can be seen from FIGS. 3 to 5. A coupling depression 48, constructed on the rear sliding element 11 as an opening, is associated with this projection 47. The coupling depression 48 is situated in a bridge 49 of the rear sliding element 11, beneath which the guide carriage 34, mounted on the guide rail 9, passes through for the described guiding engagement with the forward sliding element 10. The projection 47 of the coupling member 46 is situated in the sliding movement path of the bridge 49 of the rear sliding element 11.

An important feature for functioning of the coupling member 46 is a recess 50 in the guide rail 9, above which the projection 47 is always situated so long as the lid 4 is not slid backwards (FIGS. 3 and 5). During coupling and uncoupling, the projection 47 escapes into this recess 50. In the coupling operation, the rear edge 51 of the bridge 49 meets the inclined surface of the projection 47 facing it, the projection 47 being displaced resiliently downwards until it can engage into the coupling depression 48. During uncoupling, the rear edge of the coupling depression 48 slides over the other inclined surface of the projection 47 facing it, the projection 47 again resiliently deflecting downwards in the recess 50. In all displaced positions, the projection 47 cannot escape downwards, but lies against the guide rail, as seen for example in FIG. 4. Accordingly, in all displaced or slid positions, the coupling between the rear sliding element 11 and the guide carriage 34 cannot be disengaged.

The displacement capability of the forward sliding element 10 and thus the closure displacement travel of the lid 4 is limited by a stop 52, fixed to the guide rail 9, by which the forward sliding element can be locked by means of a locking spring 53 fixed to the stop. For this purpose, a locking member 54 is mounted on the forward sliding element 10 and a nose 55 on the locking spring. As can be seen, for example from FIG. 5, the locking spring can deflect downwards, causing the nose 55 to release the locking member 54. This deflection movement is caused by an unlocking surface 56, which is located on the forward extension 19 of the first guide block 17 and meets the nose 55 during the lowering movement. In FIGS. 3 and 5, the locking position is shown, whereas in FIG. 4 the locking components are unlocked. If, starting from FIG. 4, the front sliding element 10 is slid forwards, then towards the end of the movement the locking member 54 strikes the nose 55 and displaces the latter downwards due to inclined surfaces on nose and locking member, until the nose, when the forward sliding element 10 meets the stop 52, can snap resiliently behind the locking member 54.

As can be seen, for instance, from FIGS. 3 and 6, the intermediate frame carries, along its edges and around it, a sealing profile 57 fixed to it, for sealing the edge gap 5. This sealing profile 57, formed as a hollow chamber profile, is inserted at the forward and rearward edge of the intermediate frame 15 into an upwardly open Uprofiling 58, whereas at each of the two lateral edges it is fixed on the upwardly facing surface of a run-off flange 59 of the intermediate frame 15. Any water that may penetrate via the edge gap can pass over the run-off flange 59 into the rainwater gutter 60 situated below it of the sliding roof frame 8, which is equipped in known manner at its corners with drainage lines.

The sealing profile is furnished with an upwardly open groove 61 (FIG. 4), designed for receiving the flange 3 when the lid 4 is closed (FIG. 3). Between the outer edges of the lid and the peripheral flange 3, there is then situated a sealing strip 62 of the sealing profile 57, while an outer sealing strip 63, separated from the sealing strip 62 by the groove 61, bears from the inside against the flange 3 and the fixed roof surface 1. A smaller, inner sealing strip 64 (FIG. 5) is thus pressed against the edge of the lid. This construction of the sealing profile 57 and the fact of its fitting onto the edges of a raisable intermediate frame 15 ensures, when the lid 4 is closed, a good sealing pressure against the parts of the roof construction to be sealed to each other.

As can be seen from FIGS. 6, 8 and 10, the sealing frame 15 carries, at its inner edge, an elastic profile 65, against which in the closed position the lid 4 and lid frame 13 bear. From these Figures, the formation of a guide groove 66 on the guide rail 9 for the lid lining and the fitting of a connecting profile 67 on the sliding roof frame 8 for the roof lining can also be seen.

To explain the various functions of the sliding-lifting roof, reference is now made basically to FIGS. 3 to 5. If the lid 4, starting from its closed position shown in FIG. 3, is to be pivoted outwards into the position shown in FIG. 5 to create a rear ventilation gap 68, then the rear sliding element 11 is moved forwards by the drive cable 12. As this occurs, the coupling existing between the projection 47 and the coupling depression 48 is cancelled in the described manner. With continuing forward movement, the guide pin 28 of the raising lever 27 travels forwards both in the guide slit 29 and in the guide slit 18, the second guide block 30 pivoting upwards about its sliding hinge 31, 32 and displacing the lid 4 above the vehicle roof 1. In doing this, the lid 4 pivots about its hinges 16, without notably changing, with its forward edge, its adjoining position to the forwards surface of the automobile roof 1 and forward sealing profile 57. In this outward pivoting movement of the lid, the intermediate frame 15 remains in its at-rest position, as shown in FIG. 5. The same is true, of course, also for the pivoting in movement of the lid 4, i.e. its movement back from the raised position shown in FIG. 5 to its closed position shown in FIG. 3. In the latter operation, the rear sliding element 11 is pushed backwards by the drive cable 12, the guide pin 28 simultaneously moving backwards in the two guide slits 29 and 18. The second guide block 30 once again pivots about its sliding hinge 31, 32 until the position of the components shown in FIG. 3 is reached. In the last phase of the pivoting-in movement of the lid 4, engagement again occurs between the projection 47 and the coupling depression 48, with the result that the rear sliding element 11 is again coupled to the guide carriage 34, which has been held firm in its at-rest position during the described pivoting movement of the lid 4. It is held by the locking engagement between the locking member 54 and the nose 55, the guide engagement between the guide bolt 22 and guide channel 23, and the raising lever 27, held still by the sliding element 11. In the pivoting movement of the lid, any intermediate position can be attained for setting a ventilation gap 68 of variable size, self-locking taking place in every raised position of the lid 4 due to the guide pin 28 engaging into the two guide slits 18 and 29, which guide pin 28 in turn bears against the raising lever 27, which is held through the rear sliding element 11 by the drive cable 12. In the described lifting function of the sliding-lifting roof, the intermediate frame 15 advantageously remains pressed with its surrounding sealing profile 57 against the edges of the roof opening.

If, again, starting from the closed position shown in FIG. 3, the lid 4 is to be lowered and then displaced backwards beneath the rear surface of the automobile roof 1, as shown in an intermediate phase in FIG. 4, then the drive cable 12 is moved backwards and displaces the rear sliding element 11 backwards. Since the rear sliding element 11 bears with its bridge 49 against the guide carriage 34, the guide carriage is entrained backwards. The movement of the rear sliding element 11 backwards has no influence upon the position of the guide blocks 17, 30, because the guide pin 28 moves parallel and idling in the guide slit 18 and the rear region of the guide slit 29. By the entraining of the guide carriage 34, the link rods 41 and 43 pivot into the position shown in FIG. 4, because initially the forward sliding element 10 is prevented, by its locking engagement, and thus also the intermediate frame 15 is prevented by the guide engagement between the guide bolt 22 and the guide channel 23, from following the sliding movement. The lid 4, is of course, accordingly not yet slid. By the pivoting of the link rods 41 and 43, however, a lowering movement of the intermediate frame 15 takes place and thus of the lid 4, connected to it. At the start of this lowering movement, the rear edge of the lid is first lowered, because the rear link rod 43 is orientated vertically and, when pivoting, immediately draws the rear edge of the lid 4 downwards, whereas the forward link rod 41 is orientated obliquely and initially must pass through the vertical position, before the forward edge of the lid 4 is also lowered. This time delay between the start of the lowering movement at the rear edge of the lid and the start of the lowering movement at the front edge of the lid is sufficient for generating at the rear edge of the lid initially a pressure-balancing gap, which helps to reduce the drive forces necessary for the further lowering movement.

In the lowering movement of the intermediate frame 15 and of the lid 4 connected to it, only the rear sliding element 11 and the guide carriage 34 coupled to it slide.

Towards the end of the lowering movement, the unlocking surface 56 meets the nose 55, causing the locking engagement of the locking spring 53 with the forward sliding element 10 to be cancelled at the end of the lowering movement. With continuing displacement of the drive cable 12 towards the rear, the rear sliding element 11 now entrains not only the guide carriage 34, but also the forward sliding element 10. The guide pin 28 is now situated at the end of the two guide slits 18 and 29, with the result that during continuing displacement, the intermediate frame 15 and thus the lid 4 also are entrained backwards.

In the lowering movement, holding-down roller 69 (FIGS. 3, 10), mounted on the rear extension 20 of the first guide block 17, passes through an opening 70, situated vertically beneath it, in the guide rail 9 and remains, during the displacement of the roof components backwards, beneath a downwardly facing surface of the guide rail 9. The holding-down roller 69 has the function, in the closing displacement, of ensuring that the raisably mounted components of the roof structure cannot ascend prematurely, i.e. before the forward stop position is reached. When the forward stop position is reached, the opening 70 is immediately above the holding-down roller 69, so that the latter can emerge upwards out of the guide rail 9, when the raisable roof components are lifted.

In the closure displacement, the rear sliding element 11 entrains forwards the guide carriage 34 coupled to it, which carriage in turn, via the link rods 41, 43, entrains forwards the intermediate frame 15 and thus also the lid 4 and the forward sliding element 10, until the forward sliding element 10 meets the stop 52. The forward sliding element 10 has now completed its sliding movement, which also applies for the intermediate frame 15 due to its connection with the forward sliding element via the vertical guide elements 22 to 24. The lid, connected to the intermediate frame 15, has also arrived at the end of its displacement movement. With further forward displacement of the rear sliding element 11 and of the guide carriage 34 entrained with it, the intermediate frame 15 and all the parts connected therewith are raised into the position shown in FIG. 3 as a consequence of the resultant pivoting of the link rods 41, 43.

We claim:

1. A sliding-lifting roof for an automobile, the roof comprising a lid which is pivotally mounted on an intermediate frame in the vicinity of its forward edge; forward sliding elements provided for slidably guiding the lid on lateral guide rails; driven rear sliding elements for driving the lid; a guide carriage coupled to each of the rear sliding elements, guided on said guide rails and connected to said intermediate frame by link rods and pins which substantially form with said intermediate frame a parallelogram linkage; said guide carriage and said link rods being so constructed that they permit said lid to perform through said linkage a lifting and lowering movement wherein the link rods are arranged so that during lowering a rear edge of the lid is lowered before the forward edge.

2. In a sliding and lifting roof for an automobile comprising a generally rectangular roof opening with a downward flange at its edges, a rigid lid for said opening, a sliding roof frame, said lid being hingedly connected to an intermediate frame, a pair of guide rails, one at each side of said opening, a forward sliding element and a rearward sliding element on each said rail for guiding said sliding roof frame on both of said rails, said intermediate frame located between said lid and said sliding roof frame, guide shoes for mounting said forward sliding elements, guide shoes for mounting said rearward sliding elements on said rails, and a raising lever pivotally mounted on said rearward sliding element to raise and lower said lid, that improvement comprising:

hinge means connecting said rigid lid to said intermediate frame which is formed with a hinge eye located near the forward edge of the lid to pivotally mount said lid for raising above the automobile roof;

first guide block means beneath said intermediate frame and attached thereto:

a guide pin in said first guide block;

second guide block means having an elongate bore for engaging the guide pin of said first guide block means;

the guide pin and elongated bore providing a sliding hinge which during pivotal movement of the lid on said intermediate frame participates in relative lifting and lowering movements between said first and second guide blocks; and an elongated guide carriage slidably mounted on each said guide rail comprising a forward link rod and link pins, a rear link rod and link pins, said link rods, guide carriages, and intermediate frame substantially forming a parallelogram in which the link pins are seated at the corner points of the parallelogram, the link pins of the rear link rod lying in a substantially vertical plane with the intermediate frame in a raised position; and coupling means for said carriage to resiliently couple the rear sliding element to said carriage, so that in the closed position of the lid and in all sliding positions of the lid the guide carriage and the rear sliding element are coupled to each other while at the beginning of the pivoting movement of the hinge means the guide carriage and rear sliding element are uncoupled.

3. A sliding and lifting roof as claimed in claim 2 wherein said coupling means comprises a coupling member fixed to the guide carriage and engaging with a depression in the rear sliding element.

4. A sliding and lifting roof as claimed in claim 2 wherein a fixed stop is provided adjacent said forward sliding element to limit the sliding movement of said forward sliding element.

5. A sliding and lifting roof as claimed in claim 4 wherein said fixed stop is provided with a locking spring and said spring is provided with a nose means for automatically locking with the forward sliding element.

6. A sliding and lifting roof as claimed in claim 5 wherein the sealing profile for sealing the edge of the lid is fixed to said intermediate frame.

7. A sliding and lifting roof as claimed in claim 6 wherein said sealing profile comprises an upwardly open groove into which the downward flange of the roof opening is engaged when the lid is closed.

* * * * *